United States Patent
Bynoe

[19]

[11] Patent Number: 6,149,173
[45] Date of Patent: Nov. 21, 2000

[54] BICYCLE HAVING JUMPING CAPABILITY

[76] Inventor: Wayne Bynoe, P.O. Box 130304, Dallas, Tex. 75313

[21] Appl. No.: 09/179,371

[22] Filed: Oct. 26, 1998

[51] Int. Cl.[7] .................................................. B62K 3/00
[52] U.S. Cl. ............................................ 280/276; 280/285
[58] Field of Search .............................. 280/221, 226.1, 280/227, 275, 276, 283, 284, 285, 286, 288

[56] References Cited

U.S. PATENT DOCUMENTS

| | | | |
|---|---|---|---|
| 4,378,857 | 4/1983 | Andersson | 180/227 |
| 5,120,074 | 6/1992 | Herman et al. | 280/220 |
| 5,301,969 | 4/1994 | Bynoe | 280/221 |
| 5,356,165 | 10/1994 | Kulhawik et al. | 280/275 |
| 5,658,001 | 8/1997 | Blanchard | 280/276 |
| 5,813,683 | 9/1998 | Kulhawik et al. | 280/275 |
| 6,017,047 | 1/2000 | Hoose | 280/276 |

FOREIGN PATENT DOCUMENTS 2111924  7/1983  United Kingdom ................ 280/226.1

*Primary Examiner*—J. J. Swann
*Assistant Examiner*—Michael Cuff
*Attorney, Agent, or Firm*—Frederick R. Cantor, Esq

[57] ABSTRACT

A bicycle can have jumping capabilities by providing a spring-biased auxiliary frame directly below the primary frame, and mounting the drive sprocket on the auxiliary frame. The person riding the bicycle can transfer his weight from the bicycle seat to the foot pedals on the drive sprocket so as to lower the auxiliary frame. When the person shifts his weight back onto the seat the auxiliary frame is rapidly raised by the mounting springs, such that the auxiliary frame forcibly strikes the main frame to lift the bicycle from the ground surface.

6 Claims, 3 Drawing Sheets

BICYCLE HAVING JUMPING CAPABILITY

BACKGROUND OF THE PRESENT INVENTION

SUMMARY OF THE PRESENT INVENTION

This invention relates to a bicycle, and particularly to a bicycle having jumping capabilities. The invention is an improvement on the invention disclosed in my issued U.S. Pat. No. 5,301,969.

The term "jumping capability" is herein used to reference a construction wherein a spring means is stressed by the action of the person riding the bicycle so that when the person removes the stress the spring means exerts an upward force on the bicycle frame, thereby causing the bicycle to become airborne. The bicycle thus is enabled to jump or leap over obstacles in the path of the bicycle.

In preferred practice of the invention, the bicycle is equipped with a main frame having rotary connections to the front and rear ground wheels, whereby the bicycle can be propelled along the ground in conventional fashion.

The conventional chain-sprocket drive is provided for propulsion purposes; and the usual foot pedals are used to rotate the sprocket. However, the sprocket is rotatably supported on a special auxiliary frame that is floatably mounted on the main frame for up-and-down motion. Spring mechanisms at opposite ends of the main frame resiliently support the auxiliary frame in a raised position.

In order to achieve a jumping action the rider momentarily stops operating the foot pedals and raises his body off the seat so as to apply a large downward force on both foot pedals. The auxiliary frame is thus moved downwardly to stress the spring mechanisms. The person then abruptly transfers his weight back onto the seat while exerting an upward hand force on the handlebars. The stressed spring mechanisms propel the auxiliary frame upwardly against the upper frame. When the auxiliary frame forcibly impacts the main frame, inertia forces cause the main frame to be deflected upwardly, thus causing the bicycle to become airborne.

Further features of the invention will be apparent from the attached drawings and description of an illustrative embodiment of the invention.

In summary, and in accordance with the above discussion, the foregoing objectives are achieved in the following embodiments.

1. A bicycle with jumping capability comprising:
    a front road wheel and a rear road wheel;
    an upper main frame having rotary connections to said road wheels;
    a seat mounted on said upper main frame proximate to the rear road wheel;
    a handlebar means rotatably mounted on said upper frame proximate to the front road wheel;
    a steering connection between the front road wheel and said handlebar means;
    a lower frame floatably mounted on said upper frame for relative upward or downward movement;
    a propulsion means that includes a rotary sprocket carried by said lower frame, and a pedal means for operating said sprocket; and
    spring means biasing said lower frame upwardly; and stop means limiting upward movement of said lower frame, whereby a person riding the bicycle can exert a downward force on said pedal means to move the lower frame downwardly, after which the person can remove the downward force on said pedal means, so that the lower frame forcibly impacts said stop means to generate an upward lifting force on said upper frame.

2. The bicycle, as described in paragraph 1, wherein said spring means comprises a first spring assembly proximate to the front road wheel, and second and third spring assemblies proximate to the rear road wheel.

3. The bicycle, as described in paragraph 2, wherein said first spring assembly comprises a tension spring exerting an upward pulling force on said lower frame, and a compression spring exerting an upward pushing force on said lower frame.

4. The bicycle, as described in paragraph 2, wherein each spring assembly has a movement axis; the spring movement axes of the three spring assemblies being parallel.

5. The bicycle, as described in paragraph 2, wherein each spring assembly has a vertical movement axis.

6. The bicycle, as described in paragraph 1, wherein said spring means comprises a first spring assembly proximate to the front road wheel, and second and third spring assemblies proximate to the rear road wheel; said first spring assembly comprising a vertical intermediate cylinder attached to said lower frame, an upper cylinder attached to said upper frame, and a lower cylinder attached to said steering connection; said upper cylinder being slidably telescoped into said vertical intermediate cylinder; and said intermediate cylinder being slidably telescoped into said lower cylinder.

7. The bicycle, as described in paragraph 6, wherein said first spring assembly comprises a compression spring located in said lower cylinder and a tension spring located in said upper cylinder.

BRIEF DESCRIPTION OF THE DRAWINGS

FIG. 1 shows the bicycle in a normal riding position.

DESCRIPTION OF A PREFERRED EMBODIMENT OF THE PRESENT INVENTION

Figure 1:
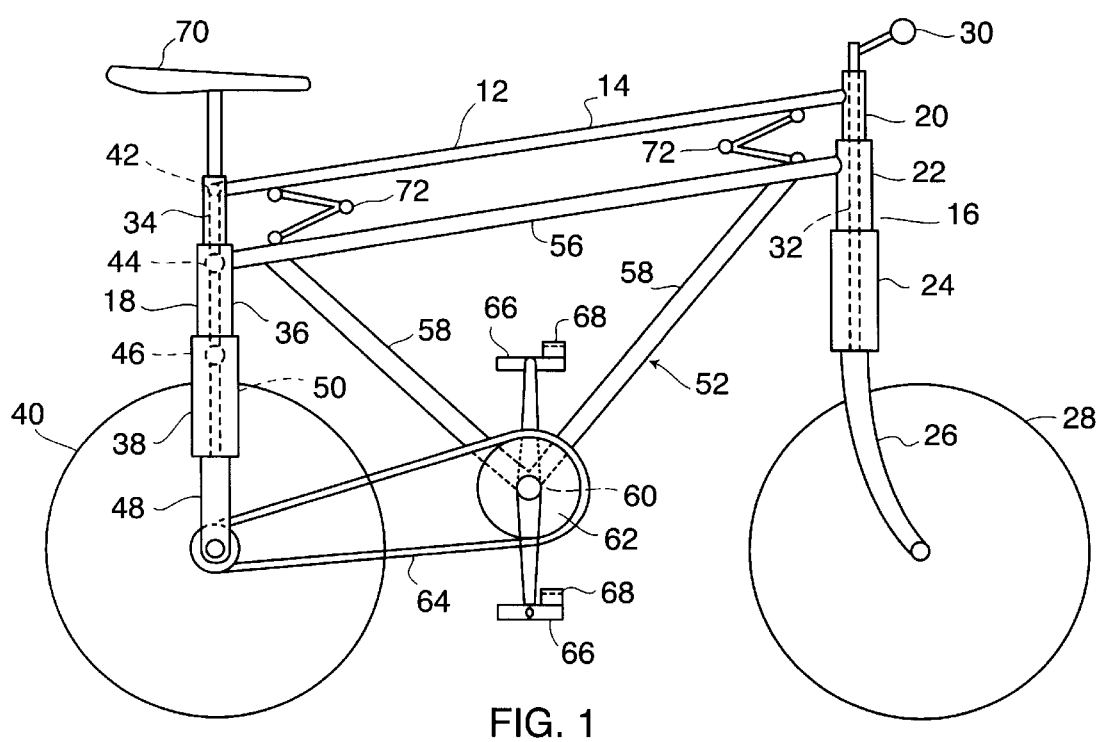
FIG. 1, is a side elevational view, of a bicycle embodying the invention.

FIG. 1, is a side elevational view, of a bicycle embodying the invention. FIG. 1 shows the bicycle in a normal riding position.

Figure 2:
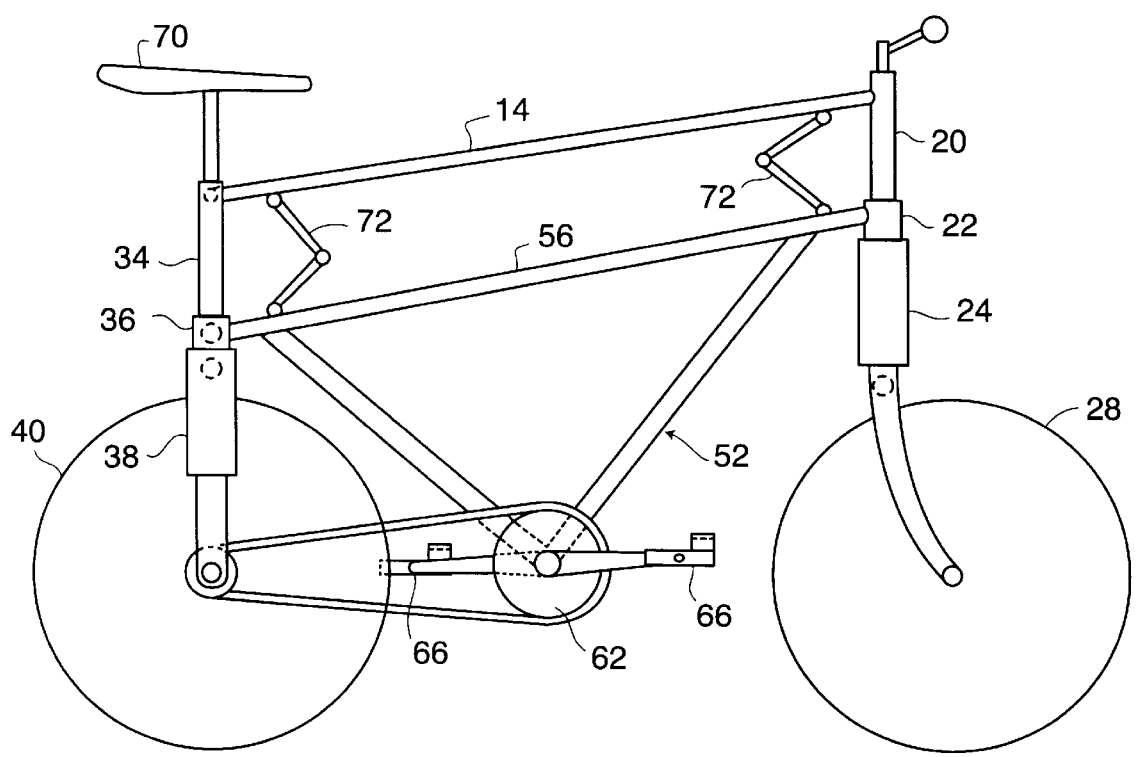
FIG. 2, is a view, taken in the same direction as FIG. 1, but with the bicycle in condition for jumping (becoming airborne).

FIG. 2, is a view, taken in the same direction as FIG. 1, but with the bicycle in condition for jumping (becoming airborne).

The drawings show a bicycle 10 embodying the invention. As shown in FIGS. 1 and 2, the bicycle comprises an upper frame 12 that includes a longitudinal bar 14 connected to a front suspension 16 and a rear suspension 18.

Front suspension 16 comprises an upper cylinder 20 attached to bar 14, an intermediate cylinder 22 slideably telescoped onto cylinder 20, and a lower cylinder 24 slideable telescoped onto cylinder 22. Cylinder 24 is mounted on a front fork structure 26 that rotatably supports the front road wheel 28.

Front wheel 28 is a steerable wheel having a steering connection with handlebars 30. The steering connection can take various forms. However, as depicted in the drawings, the steering connection takes the form of a vertical stem 32 extending vertically upwardly from fork structure 26 through the three cylinders 20, 22, and 24 to a fixed connection with handlebars 30. When the handlebars are turned, stem 32 transmits the turning force to fork structure 26. Cylinders 20, 22, and 24 do not turn with the stem.

Figure 3:
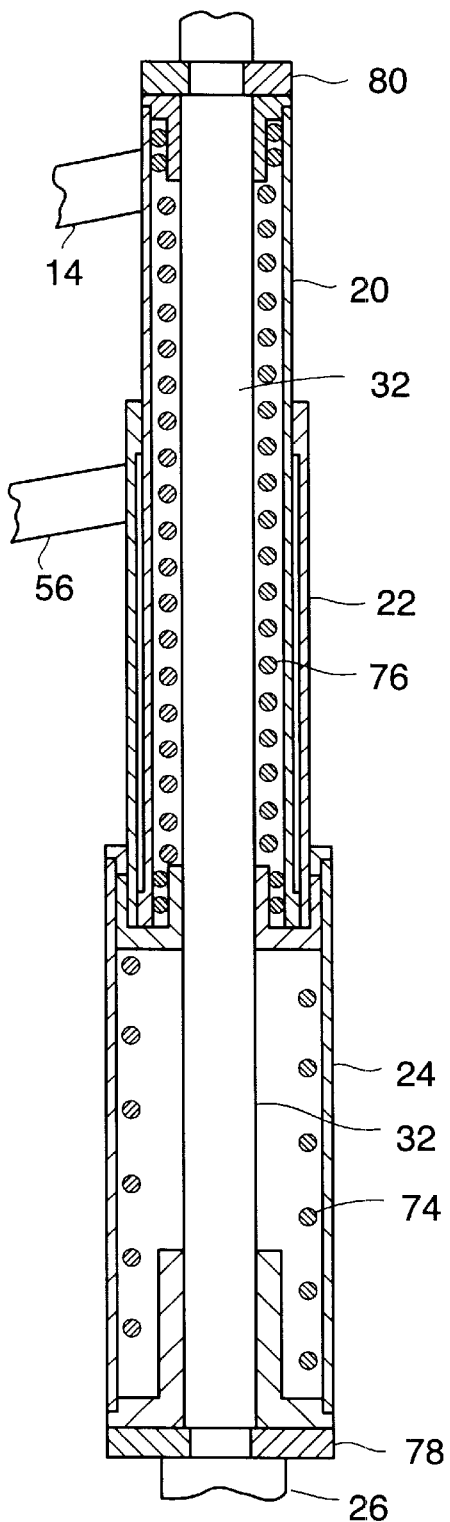
FIG. 3, is an enlarged fragmentary view, of a spring assembly used in the FIG. 1 bicycle.
Figure 4:
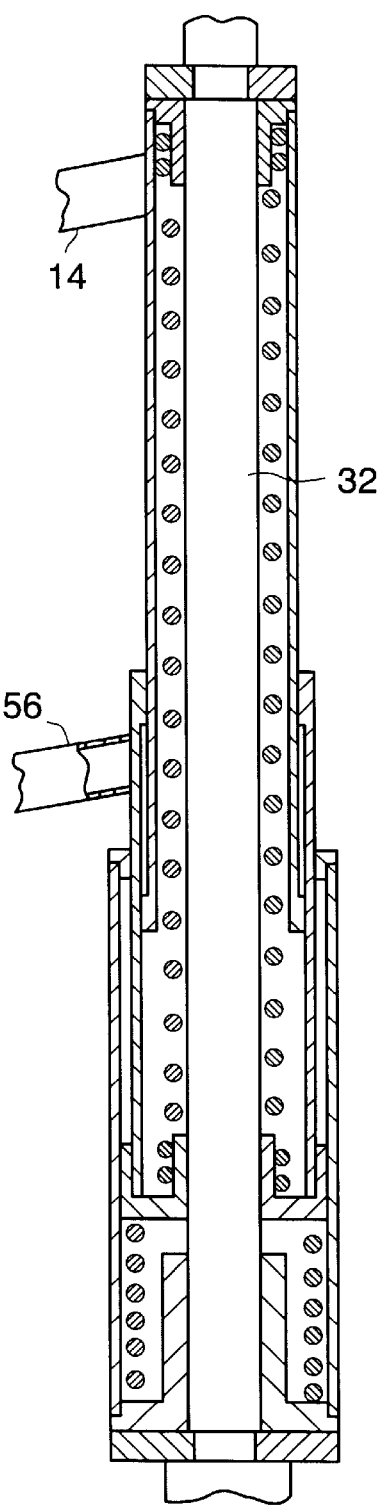
FIG. 4, is a view, taken in the same direction as FIG. 3, but showing the spring assembly in a stressed condition corresponding to the bicycle condition of FIG. 2.

Cylinders 20, 22, and 24 act as a housing for a front spring assembly that constitutes an important feature of the invention. The spring assembly is depicted in FIGS. 3 and 4.

Referring to FIGS. 1 and 2, rear suspension 18 comprises three sets of telescoping cylinders 34, 36, and 38 extending between longitudinal bar 14 and the axle for rear ground wheel 40. Each set of cylinders (34, 36, or 38) comprises two cylinders spaced apart on opposite sides of the bicycle longitudinal midplane so as to provide a central space for road wheel 40. The cylinders in each set are joined together by a transverse bar 42, 44, or 46, whereby the cylinders in each set act in unison (i.e. together).

A strut 48 extends downwardly from each cylinder 38 to provide a rotary bearing support for the axle of rear wheel 40. The upper transverse bar 42 is affixed to the longitudinal bar 14, whereby cylinders 34 are part of the bicycle main frame. A vertical rod, or stem, 50 extends through each group of cylinders 34, 36, and 38 to form fixed connections between bar 14 and struts 48. The construction is such that the main frame is rigid with respect to the front and rear wheels.

The bicycle includes a floating auxiliary frame 52, which is provided below longitudinal bar 14. Auxiliary frame 52 comprises a longitudinal bar 56, front cylinder 22, and the two rear cylinders 36, 38. The auxiliary frame further comprises two diagonal bars 58 and hub 60 that rotatably supports sprocket 62. A drive chain 64 extends around sprocket 62 and a smaller sprocket on the axle of the rear road wheel 40, whereby rotation of sprocket 62 propels the bicycle forwardly in a generally conventional fashion. The usual foot pedals 66 are provided for rotating sprocket 62. In furtherance of the invention, each foot pedal is equipped with a stirrup 68.

Each group of telescoped cylinders 34, 36, and 38 acts as a housing for a rear spring assembly constructed generally similarly to the front spring assembly depicted in FIGS. 3 and 4. These front and rear spring assemblies cooperatively support the floating auxiliary frame 52 in an elevated position, as depicted in FIG. 1. The person seated on bicycle seat 70 can exert foot pressure on pedals 66 to rotate sprocket 62 and thereby propel the bicycle forwardly.

In order to execute a jumping action the person transfers his weight from seat 70 onto pedals 66, 66, such that auxiliary frame 52 is lowered from the FIG. 1 position to the FIG. 2 position against the lifting force provided by the front and rear spring assemblies. With the auxiliary frame in the lowered position, the person returns his weight onto bicycle seat 70, whereupon the auxiliary frame rapidly moves upwardly to the FIG. 1 position. Abutment mechanisms associated with the front and rear spring assemblies enable the upwardly moving frame 52 to forcibly impact the main frame 12, such that the main frame becomes airborne. The jumping process can be enhanced by the person exerting upward lifting forces on handlebars 30 and stirrups 68.

During vertical movements of auxiliary frame 52, cylinders 22 and 36 move vertically, up, or down, relative to the associated cylinders 20, 24 and 34, 38. It is desirable that cylinders 22 and 36 move in unison, so as to remain parallel during these up and down motions. This desired parallelism is facilitated by two sets of pivot linkages 72 trained between bars 14 and 56. Linkages 72 tend to keep bars 14 and 56 parallel, which in turn tends to keep cylinders 22 and 36 parallel.

FIG. 3, is an enlarged fragmentary view, of a spring assembly used in the FIG. 1 bicycle.

FIG. 4, is a view, taken in the same direction as FIG. 3, but showing the spring assembly in a stressed condition corresponding to the bicycle condition of FIG. 2.

FIGS. 3 and 4 show the front spring assembly. The assembly comprises a compression coil spring 74 located within cylinder 24, and a tension coil spring 76 located within cylinders 20 and 22. Spring 74 is trained between the lower end wall of cylinder 24 and the lower end wall of cylinder 22. Tension spring 76 is trained between the lower end wall of cylinder 22 and the upper end wall of cylinder 20.

As previously noted, rotary stem 32 extends vertically through the front spring assembly. A split collar 78 is clamped to stem 32 to form a bearing surface for the lower end wall of cylinder 24. Another split collar 80 is attached to the upper end wall of cylinder 20 to stabilize cylinder 20 relative to stem 32, while permitting the stem to rotate (for steering purposes).

It will be seen from FIGS. 3 and 4 that when the auxiliary frame 52 is lowered, spring 74 is compressed while spring 76 is tensioned. When the downward force is removed, the two springs return auxiliary frame 52 to its FIG. 3 position. The lower end wall 82 of cylinder 22 forcibly strikes the upper end wall of cylinder 24 and the lower end wall of cylinder 20, thereby transferring the upward momentum force to the bicycle main frame, such that the bicycle becomes airborne. The lower end wall of cylinder 20 and the upper end wall of cylinder 24 form stops that cause the upward momentum force to be abruptly transferred from auxiliary frame 52 to the main frame 12.

The rear spring assemblies are constructed generally similarly to the assembly depicted in FIGS. 3 and 4. Each spring in the rear spring assembly will have a lesser force than the corresponding spring in the FIG. 3 assembly in order to have approximately the same total loading on the front and rear assemblies.

The present invention, described above, relates to a bicycle having jumping capability. Features of the present invention are recited in the appended claims. The drawings contained herein necessarily depict structural features and embodiments of the bicycle having jumping capability, useful in the practice of the present invention.

However, it will be appreciated by those skilled in the arts pertaining thereto, that the present invention can be practiced in various alternate forms, proportions, and configurations. Further, the previous detailed descriptions of the preferred embodiments of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

I claim:

1. A bicycle with jumping capability comprising:

a front road wheel and a rear road wheel;

an upper main frame having rotary connections to said road wheels;

a seat mounted on said upper main frame proximate to the rear road wheel;

a handlebar means rotatably mounted on said upper frame proximate to the front road wheel;

a steering connection between the front road wheel and said handlebar means;

a lower frame floatably mounted on said upper frame for relative upward or downward movement;

a propulsion means that includes a rotary sprocket carried by said lower frame, and a pedal means for operating said sprocket;

a spring means biasing said lower frame upwardly;

wherein said spring means comprises a first spring assembly proximate to the front road wheel, and a second and third spring assemblies proximate to the rear road wheel, and a stop means limiting upward movement of said lower frame, whereby a person riding the bicycle can exert a downward force on said pedal means to move the lower frame downwardly, after which the person can remove the dowward force on said pedal means, so that the lower frame forcibly impacts said stop means to generate an upward lifting force on said upper frame.

2. The bicycle, as described in claim 1, wherein said first spring assembly comprises a tension spring exerting an upward pulling force on said lower frame, and a compression spring exerting an upward pushing force on said lower frame.

3. The bicycle, as described in claim 1, wherein each spring assembly has a movement axis; the spring movement axes of the three spring assemblies being parallel.

4. The bicycle, as described in claim 1, wherein each spring assembly has a vertical movement axis.

5. The bicycle, as described in claim 1, wherein said first spring assembly further comprising a vertical intermediate cylinder attached to said lower frame, an upper cylinder attached to said upper frame, and a lower cylinder attached to said steering connection;

said upper cylinder being slidably telescoped into said vertical intermediate cylinder; and said intermediate cylinder being slidably telescoped into said lower cylinder.

6. The bicycle, as described in claim 5, wherein said first spring assembly comprises a compression spring located in said lower cylinder and a tension spring located in said upper cylinder.

\* \* \* \* \*